United States Patent [19]

Blümel et al.

[11] 4,148,780

[45] Apr. 10, 1979

[54] THERMOPLASTIC MATERIALS

[75] Inventors: Harald Blümel, Marl; Klaus zur Nedden, Haltern, both of Fed. Rep. of Germany

[73] Assignee: Chemische Werke Huels Aktiengesellschaft, Marl, Fed. Rep. of Germany

[21] Appl. No.: 857,948

[22] Filed: Dec. 6, 1977

[30] Foreign Application Priority Data

Dec. 17, 1976 [DE] Fed. Rep. of Germany ....... 2657272

[51] Int. Cl.$^2$ ................................................ C08K 3/04
[52] U.S. Cl. ......................... 260/42.46; 260/33.6 PQ; 260/28.5 AS; 260/42.47; 264/175; 264/349; 428/489; 428/523
[58] Field of Search .......... 260/42.47, 42.46, 28.5 AS, 260/33.6 PQ

[56] References Cited

U.S. PATENT DOCUMENTS

| | | | |
|---|---|---|---|
| 3,351,495 | 11/1967 | Larsen et al. | 260/28.5 AS |
| 3,440,208 | 4/1969 | Foglia et al. | 260/42.21 |
| 3,459,089 | 8/1969 | Clark | 260/42.47 |
| 3,769,256 | 10/1973 | Yoshimoto et al. | 260/42.47 |
| 3,864,305 | 2/1975 | Jordan et al. | 260/42.46 |
| 3,868,344 | 2/1975 | Newberg et al. | 260/42.47 |
| 3,963,647 | 6/1976 | Straub | 260/42.46 |
| 4,046,945 | 9/1977 | Baxmann et al. | 260/42.46 |

FOREIGN PATENT DOCUMENTS

1044503 10/1966 United Kingdom.
1400145 7/1975 United Kingdom.

OTHER PUBLICATIONS

Dunn, Technology of Reinforcement of Elastomers, Blends of Elastomers and Thermoplastics, pp. 1 to 17.

*Primary Examiner*—Melvyn I. Marquis
*Attorney, Agent, or Firm*—Millen & White

[57] ABSTRACT

A thermoplastic material, suitable for fabrication into panels or sheets, and having high strength at elevated temperatures comprises:
(a) 100 parts by weight of polyolefin elastomer;
(b) more than 50, but no more than 150 parts by weight of crystalline or partially crystalline polyolefin;
(c) 30 to 150 parts by weight of carbon black; and, optionally,
(d) up to 50 parts by weight of bitumen;
(e) up to 30 parts by weight of mineral oil;
(f) up to 240 parts by weight of chalk or siliceous chalk; and
(g) up to 10 parts by weight of lubricant.

4 Claims, No Drawings

THERMOPLASTIC MATERIALS

BACKGROUND OF THE INVENTION

This invention relates to thermoplastic materials having a satisfactory strength at elevated temperatures, and their use in the manufacture of molded articles, especially panels or sheets.

It is known to utilize thermoplastic materials, for example in the form of panels or sheets, to make moisture seals. Such panels or sheets can be joined together to form rather large sealed surfaces either by heat welding or by the use of a solution welding agent such as a swelling agent or a special adhesive. Alternatively, they can also be loosely laid on substrates such as concrete, wood, bitumen, and thermal insulating materials containing entrapped air; or can be glued to such supporting materials at a few selected locations or over their entire surface area with the use of special large-surface area adhesives.

Important properties of the thermoplastic materials include suitable rheological characteristics, satisfactory weldability, and good resistance to weathering and other environmental influences. Of especially great significance for the panels or sheets produced from these materials are the mechanical characteristics of the latter. Particularly, sufficient strength characteristics are necessary so that the panels or sheets can withstand long-term tensile or expansion stresses at elevated temperatures, e.g., up to 70° C., such as occur on flat roofs during the height of the summer in Central Europe or in countries having a tropical or subtropical climate.

SUMMARY OF THE INVENTION

Accordingly, it is an object of this invention to provide thermoplastic materials which, especially when formed in the shape of panels or sheets, exhibit high strength at elevated temperatures in addition to the aforementioned conventional properties.

This and other objects of this invention as will be made clear below have been achieved by providing thermoplastic materials comprising:

(a) 100 parts by weight of polyolefin elastomer;
(b) more than 50, but not more than 150 parts by weight of crystalline or partially crystalline polyolefin;
(c) 30 to 150 parts by weight of carbon black; and, optionally;
(d) up to 50 parts by weight of bitumen;
(e) up to 30 parts by weight of mineral oil;
(f) up to 240 parts by weight of chalk or siliceous chalk; and
(g) up to 10 parts by weight of lubricant.

DETAILED DISCUSSION

The subject matter of this application is related to that of U.S. application Ser. Nos.: 858,038 and 858,127, both filed on Dec. 6, 1977.

The blend of an elastomer and a crystalline or partially crystalline polyolefin, per se, is known; however, the particular compositions of this application are new and display unexpectedly superior properties as described herein (J. R. Dunn, Technology of Reinforcement of Elastomers, "Blends of Elastomers and Thermoplastics—A Review", J1-J17, especially J12 and J 13).

Suitable polyolefin elastomers, which form the basis of the thermoplastic materials of this invention, include polymers obtainable from ethylene; one or more α-olefins of 3-8 carbon atoms, preferably, propylene; and, optionally, one or more multiple olefins; or mixtures thereof. The elastomers are prepared using so-called Ziegler-Natta catalysts, which can additionally contain activators and modifiers, in a solution or dispersion at temperatures of from $-30°$ to $+100°$ C., for instance according to the methods of DAS's [German Published Applications] Nos. 1,570,352; 1,595,442, and 1,720,450, as well as DOS [German Unexamined Laid-Open Application] No. 2,427,343.

As component (a), preferred elastomers are saturated polyolefin elastomers consisting of 15–90% by weight, preferably 30–75% by weight of ethylene and of 85–10% by weight, preferably 70–25% by weight of propylene and/or butene-1; and unsaturated polyolefin elastomers consisting, in addition to ethylene and propylene or butene-1 in the above relative proportions, of a $C_{4-12}$ multiple olefin in such an amount that the elastomers contain 0.5–30 double bonds per 1,000 carbon atoms. Especially preferred multiple olefins are cis- and trans-1,4-hexadiene, dicyclopentadiene, 5-methylene-, 5-ethylidene-, and 5-isopropylidene-2-norbornene.

Especially suitable polyolefins to be added to the composition of this invention in amounts of more than 50 but no more than 150 parts by weight, preferably 20–100 parts by weight, include the crystalline and partially crystalline forms of polyethylene having densities of 0.910–0.975 g./cc., RSV values (measured at 135° C. in decahydronaphthalene) of 0.5–3.3 dl./g., and melt indices of 0.2–50 g./10 min. However, it is also possible to employ partially crystalline copolymers of ethylene with other α-olefins, and copolymers having the same properties. Suitable α-olefins are those having from 3 to 6 C atoms. Also suitable are crystalline and partially crystalline homo- and copolymers of propylene or butene-1, with these other α-olefins, preferably with ethylene, for example homo- and copolymers or propylene having densities of 0.90–0.910 g./cc., RSV values (measured at 135° C. in decahydronaphthalene) of 1.0–10 dl./g., and melt indices of 0.1–50 g./10 min.; and homo- and copolymers of butene-1 with densities of 0.910–0.925 g./cc., RSV values (measured at 135° C. in decahydronaphthalene) of 1.0–10 dl./g., and melt indices of 0.1–100 g./10 min. Mixtures of these polyolefins can also be used.

To improve the weldability of the molded articles produced from the materials of this invention, there can also be included, in addition to the crystalline or partially crystalline polyolefins, minor amounts (up to about one-third of the amount by weight of the crystalline or partially crystalline polyolefin, preferably up to 20% of this amount) of atactic polypropylene and/or polybutene-1 having a density of about 0.86 g./cc. and RSV values (measured at 135° C. in decahydronaphthalene) of 0.1–3.0 dl./g.

Suitable carbon blacks include those produced by the furnace method (Ullmanns Encyklopadie der technischen Chemie, 14. Band (1963), page 800), preferably those of the types FEF (fast extruding furnace black), GPF (general purpose furnace black), HMF (high modulus furnace black), APF (all purpose furnace black), HAF (high abrasion furnace black), FT (fine thermal black), MT (medium thermal black) and SRF (semireinforcing furnace black).

Other carbon blacks than those prepared by the furnace method are also suitable for use in the composition, for instance channel or thermal carbon blacks (l.c.). The conventional terminology of the carbon blacks used is described in ASTM D 1765-68.

The carbon blacks are added to the compositions of this invention in amounts of 30-150 parts by weight, preferably 40-130 parts by weight.

In addition, the materials can optionally be combined with chalk and/or siliceous chalk in an amount of up to 240 parts by weight, generally 3-200 parts by weight, preferably 40-180 parts by weight, as additional fillers. Suitable such chalks include natural, ground pigments containing predominantly calcium carbonate or silicic acid, or precipitated calcium carbonate, which can be coated, for example with fatty acid derivatives, in the forms and manner conventional for rubber processing operations.

Other fillers conventional in thermoplastic compositions may also be included, such as, silicates, kaolin, talc, ground slate (S. Boström, Kautschuk-Handbuch (1960), 2. Band, pages 242-274).

Other optional ingredients for the compositions of this invention are up to 50 parts by weight, in general 5-40 parts by weight, preferably 10-30 parts by weight, of bitumen; up to 30 parts by weight, generally 3-25 parts by weight, preferably 5-20 parts by weight, of mineral oil; and/or up to 10 parts by weight, in general 0.5-10 parts by weight, preferably 3-8 parts by weight of lubricant.

Suitable bitumens include liquid to solid distillation residues of the petroleum refinery process, consisting predominantly of highly condensed hydrocarbons, the structure of which can be partially altered, for example by oxidation ("blown bitumens") (Ullmanns Encyklopädie der technischen Chemie, 4. Band (1953), pages 400-446).

Suitable mineral oils include those having viscosities between 50 and 5,000 centistokes at 20° C., preferably between 200 and 3,000 centistokes at 20° C. and a density of 0.84-0.98 g./cc. Such oils can contain paraffinically as well as naphthenically or aromatically bound carbon atoms (S. Boström, Kautschuk-Handbuch (1960). 2. Band, pages 290-293).

Suitable lubricants include, for example fatty acids having 14 to 20 C atoms, such as stearic acid, salts of fatty acids, such as zinc stearate, or mixtures of fatty acids and/or fatty acid derivatives.

A particularly preferred composition consists essentially of an elastomer, a crystalline or partially crystalline polyolefin and carbon black.

The claimed thermoplastic materials can be manufactured, for example, using commercial internal mixers having a plunger and equipped with cooling means. The mixing step can optionally be conducted with heating. The mixing time periods generally required to achieve satisfactory homogenization are dependent upon the usual conventional considerations; for example, the recipe employed, the structure of the starting materials, the construction characteristics of the mixing unit and the subsequent processing steps employed, as well as the attendant conditions and devices selected. Such considerations include: bulk temperature (generally 50-220° C., preferably 80-150° C.); the extent to which the internal mixer is filled (generally to a degree to 1.0-1.8, preferably 1.2-1.5, based on the useful capacity of the mixer which is only a part of the total available capacity); and rotor speeds (in general up to 100 r.p.m., preferably 10-40 r.p.m.). The resultant homogenization time periods are generally between 1 and 100 minutes, preferably about 35 minutes. After a sufficient degree of homogenization, the materials, the temperatures of which range normally between 50° and 220° C., are ejected. The order of mixing of the ingredients is not critical and can be varied in accordance with conventional procedures.

In case of mixture compositions having higher concentrations of bitumen, it may be necessary to cool the material prior to ejection (cooling time 1-30 minutes, preferably 3-15 minutes), in order to avoid extensive adhesion to the mixer jacker and rotors, which can make the ejection practically impossible in some cases; (See related U.S. application Ser. No. 623,510, filed Oct. 17, 1975 now U.S. Pat. No. 4,081,502). The materials discharged from the internal mixer are then converted into endless strips or strands, for example, by pairs of rolls or screwdriven units, and are either granulated or directly passed on to the subsequent processing systems.

Suitable such processing systems, serving, for example, for the production of panels or sheets, include conventional calenders, extruders having slot dies, or so-called roller head units. These can also be equipped with devices for the application or incorporation of support materials, such as, for example, nonwoven mats of synthetic fibers and glass fabric. Panels or sheets can be of any conventional thickness or size; generally being from 0.5 to 4.0 mm thick.

The materials of this invention, which are distinguished particularly by high strength at elevated temperatures (about 70° C.), are particularly useful in building construction, especially in the form of panels or sheets. For example, they can be used for the sealing of buildings having flat roofs. They are also suitable for underground contruction, for example, for the lining of collecting tanks, preliminary holding basins, settling tanks, and reservoirs, and for the supportive lining for ponds, canals, and artificial lakes. It is furthermore possible to utilize these articles as sealing sheets for cut-throughs, tunnels, and underpasses, as well as for bridge construction and high-rise seals in groundwater zones.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

In a laboratory kneader having a useful capacity of 2 liters (Werner & Pfleiderer, type GK 2 with plunger), the ethylene-propylene diene elastomer described below and denoted by EPDM I (30% by weight of propylene; sufficient diene (ethylidene norbornene) to give 8 double bonds/1,000 carbon atoms; $ML_{1+4}$ at 100° C.=87; polymer green strength=130 kp./cm$^2$) was mixed with the products set forth below, using the indicated mixing times at an initial kneader temperature of 90° C. and a rotor speed of 50 r.p.m.

| Mixing Step | | Time/Minutes |
| --- | --- | --- |
| Introduction of 1,048 g. | EDPM I | 0 |
| Introduction of 350 g. | bitumen B 80 | |
| Introduction of 1,518 g. | SRF black | 1 |
| Introduction of 530 g. | polyethylene | |
| (density 0.923 g./cc. | | 3 |
| melt index 8g./10 min.) | | |
| Cleaning of plunger | | 4 |

| Mixing Step | Time/Minutes |
| --- | --- |
| Ejection | 9 |

The homogeneous mass was ejected at a bulk temperature of 145° C. and then formed into a sheet on a laboratory rolling mill at a surface temperature of 50° C. This sheet was cut into the shape of strips or was granulated.

The sheets produced from the strips or granulated materials on a four-roll laboratory calender were tested for tensile strength according to DIN 53 504, first at room temperature (RT) and then at 70° C. Thereafter, they were tested according to DIN 53 505, for hardness at the same temperatures. For the thermoplastic materials produced according to the above example, at the two above-indicated temperatures, the following values were obtained:

|  | RT | 70° C. |
| --- | --- | --- |
| Strength, MPa: | 5.8 | 2.6 |
| Elongation, %: | 400 | 220 |
| Hardness, Shore A: | 92 | 79 |

EXAMPLE 2

The following thermoplastic material was produced as described in Example 1:

| Mixing Step | | Time/Minutes |
| --- | --- | --- |
| Introduction of 897 g. | EDPM I | 0 |
| Introduction of 269 g. | bitumen B 80 | |
| Introduction of 807 g. | SRF black | 1 |
| Introduction of 359 g. | chalk | |
| Introduction of 897 g. (density of 0.957 g./cc. melt index 0.7 g./10 min.) | polyethylene | 3 |
| Cleaning plunger | | 4 |
| Ejection | | 9 |

The ejection temperature was 152° C. The test data determined in accordance with Example 1 were as follows:

| Strength, MPa: | 9.1 | 3.5 |
| --- | --- | --- |
| Elongation, %: | 710 | 290 |
| Hardness, Shore A: | 92 | 85 |

EXAMPLE 3

Example 2 was repeated except that, instead of 897 g. of polyethylene, the mixture was prepared with 673 g. of polypropylene (density 0.909 g./cc., melt index 2.0 g./10 min.). The mass was ejected at 154° C.

The test data, determined as described in Example 1, were as follows:

|  | RT | 70° C. |
| --- | --- | --- |
| Strength, MPa: | 9.2 | 4.7 |
| Elongation, %: | 250 | 160 |
| Hardness, Shore A: | 93 | 85 |

EXAMPLE 4

Under the conditions set forth in Example 1, a thermoplastic material was produced from the components set forth below and within the indicated time periods:

| Mixing Steps | | Time/Minutes |
| --- | --- | --- |
| Introduction of 628 g. | EPDM I | 0 |
| Introduction of 189 g. | bitumen B 80 | |
| Introduction of 565 g. | SRF black | |
| Introduction of 252 g. | chalk | 1 |
| Introduction of 912 g. (density of 0.935 g./cc., melt index 0.5 g./10 min.) | polyethylene | 3 |
| Cleaning of plunger | | 4 |
| Ejection | | 9 |

The test data, determined analogously to Example 1, were as follows:

|  | RT | 70° C. |
| --- | --- | --- |
| Strength, MPa: | 10.9 | 4.4 |
| Elongation, %: | 760 | 420 |
| Hardness, Shore A: | 94 | 87 |

EXAMPLE 5

Under the conditions set forth in Example 1, the following mixture components were intermixed as indicated:

| Mixing Step | | Time/Minutes |
| --- | --- | --- |
| Introduction of 1,048 g. | EDPM I | 0 |
| Introduction of 945 g. | SRF black | 1 |
| Introduction of 530 g. (density of 0.923 g./cc., melt index 8 g./10 min.) | polyethylene | 3 |
| Cleaning of plunger | | 4 |
| Ejection | | 9 |

The ejection temperature of the batch was 160° C. The test values, determined analogously to Example 1, were as follows:

|  | RT | 70° C. |
| --- | --- | --- |
| Strength, MPa: | 8.2 | 2.6 |
| Elongation, %: | 860 | 240 |
| Hardness, Shore A: | 90 | 72 |

EXAMPLE 6

The following mixing sequence was utilized for mixing the components of the material produced analogously to Example 1 with an ejection temperature of 158° C.:

| Mixing Step | | Time/Minutes |
| --- | --- | --- |
| Introduction of 897 g. | EDPM I | 0 |
| Introduction of 200 g. | bitumen B 80 | |
| Introduction of 70 g. | naphthenic mineral oil | |
| Introduction of 807 g. | SRF black | 1 |
| Introduction of 359 g. | chalk | |
| Introduction of 897 g. (density 0.957 g./cc., melt index of 0.7 g./10 min.) | polyethylene | 3 |
| Introduction of lubricant | | |
| Cleaning of plunger | | 4 |
| Ejection | | 9 |

The test data determined according to Example 5 are as follows:

|  | RT | 70° C. |
|---|---|---|
| Strength, MPa: | 0.9 | 3.2 |
| Elongation, %: | 690 | 270 |
| Hardness, Shore A: | 91 | 84 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modification of the invention to adapt it to various usages and conditions.

What is claimed is:

1. A thermoplastic material which comprises:
   (a) 100 parts by weight of polyolefin elastomer;
   (b) more than 50, but no more than 150 parts by weight of crystalline or partially crystalline polyolefin;
   (c) 30 to 150 parts by weight of carbon black; and
   (d) 3 to 240 parts by weight of chalk, siliceous chalk or a mixture thereof;
   wherein polyolefin elastomer component (a) is a saturated elastomer consisting of 15–90% of ethylene and 85–10% of propylene, butene-1 or mixture thereof; or an unsaturated elastomer consisting of ethylene in combination with propylene, butene-1 or mixture thereof, in a ratio of from 15/85 to 90/10, respectively, and an amount of a multiple olefin sufficient to provide from 0.5–30 double bonds per 1000 carbon atoms of the elastomer; and wherein the crystalline or partially crystalline polyolefin component (b) is polyethylene or a copolymer thereof with an $\alpha$-olefin having a density of 0.910–0.975 g./cc., and RSV value of 0.5–3.3 dl./g. and a melt index of 0.2–50 g./10 min.; a homo- or copolymer, with an $\alpha$-olefin, of propylene having a density of 0.90–0.910 g./cc., an RSV value of 1.0–10 dl./g. and a melt index of 0.1–50 g./10 min.; or a homo- or copolymer, with an $\alpha$-olefin, of butene-1 having a density of 0.910–0.925 g./cc., an RSV value of 1.0–10 dl./g. and a melt index of 0.1–100 g./10 min.

2. The thermoplastic material of claim 1 which additionally comprises atactic polypropylene, polybutene-1 or a mixture thereof in an amount of up to about ⅓ of the amount by weight of component (b).

3. The thermoplastic material of claim 1 which further comprises:
   (e) up to 50 parts by weight of bitumen;
   (f) up to 30 parts by weight of mineral oil; and
   (g) up to 10 parts by weight of lubricant.

4. A sheet or panel composed of the thermoplastic material of claim 1.

* * * * *